A. M. CAPRO.
FILTER
APPLICATION FILED JUNE 19, 1920.

1,429,488.

Patented Sept. 19, 1922.

INVENTOR.
A. M. Capro.
BY Charles L. Wright
ATTORNEY

Patented Sept. 19, 1922.

1,429,488

UNITED STATES PATENT OFFICE.

ANGELO M. CAPRO, OF PHILADELPHIA, PENNSYLVANIA.

FILTER.

Application filed June 19, 1920. Serial No. 390,079.

*To all whom it may concern:*

Be it known that I, ANGELO M. CAPRO, a subject of the King of Italy, and a resident of Philadelphia, in the county of Philadelphia and State of Pennsylvania, have invented certain new and useful Improvements in Filters, of which the following is a specification.

The main object of this invention is to provide an effective and commodious type of filter in which a series of independent containers, each adapted to contain filtering material of different grade or substance, are removably engaged and normally clamped in operative position.

A further object is to provide a filter so arranged that its interior and all parts contained therein are easily accessible.

Another object is to provide a filter containing a chamber for the filtered liquid, the chamber having an inclined bottom, and means whereby the liquid may be withdrawn from either the upper or lower portion of the chamber.

These and other objects, such as compactness, simplicity, low cost of manufacture and neatness of appearance, are attained by the novel construction and combination of parts hereinafter described and shown in the accompanying drawings, forming a material part of this disclosure, and in which.

Figure 1:
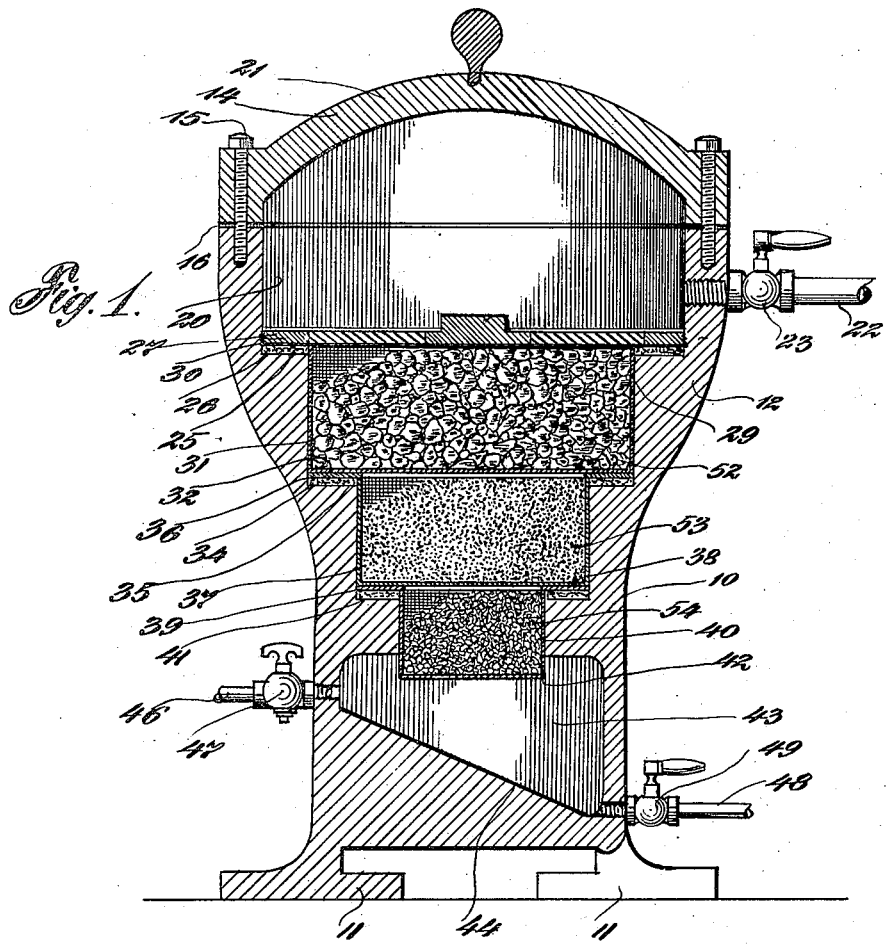
Figure 1 is a vertical sectional view taken through the center of a filter made in accordance with the invention.
Figure 2:
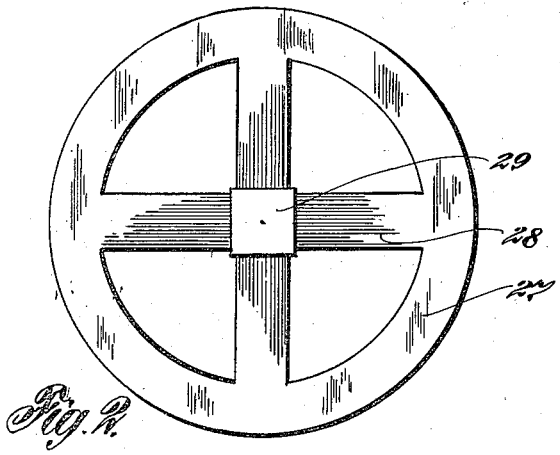
Figure 2 is a plan view of the clamp ring employed.
Figure 3:
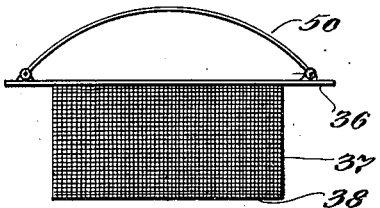
Figure 3 is a front elevational view of one of the filter material containers.

Referring to the drawings in detail, the numeral 10 designates the main cylindrical body of the filter, the same resting upon feet 11. The upper body portion 12 is expanded and provided with a cap 14, secured by screws 15, clamping a ring or gasket 16 between the abutting surfaces, the cap having a knob 17 at its highest point by which it may be conveniently handled.

An annular chamber 20 is formed in the upper part 12 of the filter body, a co-operative opening 21 extending into the cap 14.

Entering the chamber 20 is a pipe 22, leading from a source of supply of the liquid to be filtered and provided with a control valve 23.

Resting on the level bottom 25 of the chamber 20 is a packing ring 26 secured by a clamp ring 27 screwed into the chamber 20 near its bottom and provided with arms 28 radiating from the raised center 29, squared to receive a wrench for adjusting the clamp ring.

Interposed between the clamping ring 27 and packing 26 is a flat annular flange 30, from the center of which depends a circular basket 31 made of foraminous material, as woven wire, or perforated sheet metal, its bottom 32 contacting with a similar but smaller flange 36 of the second or intermediate basket 37.

The flange 36 is seated upon a cushion ring 34 resting on the bottom 35 of the chamber containing the uppermost basket 31 while the bottom 38 of the intermediate basket 37 rests on the flange 39 of the lower basket 40, below which is a cushion ring 41 seated on the bottom of the chamber containing the intermediate basket.

The bottom 42 of the lowermost basket 40 extends into the center of a circular chamber 43 having an inclined bottom in the base of the body 10.

Entering the upper portion of the chamber 43, from one side of the base, is a pipe 46, controlled by a valve 47, while on the opposite side, at the lowermost portion of the chamber 43, is another pipe 48 controlled by a valve 49, this latter valve being used to withdraw any sediment that may form in the chamber 43, while the pipe 46 delivers the clear effluent.

Each of the several baskets 31, 37 and 40 are provided with pivoted bails or handles 50, normally turned level with their respective flanges but which may be raised when it is desired to manipulate the baskets in entering or removing them.

The uppermost basket 31 is filled with relatively coarse filtering material 52 as lumps of charcoal, pebbles, etc., the intermediate basket 37 containing suitable media 53 of a finer nature, while the lowermost basket 40 contains the finest 54 of all the material used.

In operation, the parts being assembled as shown, the valve 23 is opened, permitting the liquid to be filtered to enter the chamber 20 and pass successively through the filtering material in the several baskets, eventually being deposited in the chamber 43, where the clear effluent may be withdrawn through the pipe 46 as required.

If it becomes necessary to inspect, cleanse, renew or repair the interior parts, the valve 23 is closed, cap 14 removed and clamp ring 27 unscrewed, permitting the several baskets and their contents to be withdrawn in an obvious manner.

Due to the use of cushion rings below the supporting flanges, the seats do not require machine finishing, and neither does the interior of the body, thus making a filter relatively cheap to construct.

It will be apparent that the flow may be continuous or intermittent and, due to the inclined floor of the sedimentation chamber 43, should sediment occur, it is not roiled or disturbed by operating the outlet 46, but may be withdrawn through the pipe 48.

Having thus described my invention and set forth the manner of its construction, application and use, what I claim as new and desire to secure by Letters Patent, is:—

1. A filter comprising an upright body having a plurality of progressively contracted chambers therein, a sediment chamber in the base of said body having an inclined bottom, an inlet to the uppermost of said chambers, outlets arranged at different heights in said sediment chamber, open meshed baskets in the intermediate chambers, said baskets containing filtering material, means for manipulating said baskets, and a single means for clamping said baskets in their respective chambers.

2. A filter comprising an upright body having a plurality of progressively contracted communicating chambers therein including a discharge chamber having a diagonally inclined bottom, a cap removably engaged over said body, porous baskets containing filtering material in each of the intermediate chambers, means for clamping said baskets therein, a controlled inlet to the uppermost of said chamber, and controlled outlets leading respectively from the upper and lower portions of said discharge chamber.

3. A filter comprising a body having a series of communicating chambers disposed in the same axial plane, pervious baskets in the intermediate chambers, supporting flanges formed with said baskets, cushion rings set in the bottom of said chambers upon which said flanges rest, a clamp ring engageable with the flange on the uppermost basket, means for adjusting said clamp, and means for manipulating said baskets.

4. A filter comprising a plurally chambered body, a cap thereover, pervious baskets in said chambers containing filtering material, annular flanges on the upper edges of each basket upon which the bottom of the next adjacent upper basket rests, cushion rings below said flanges, an externally threaded clamp ring engaging the uppermost basket, means for adjusting said clamp ring, and handles pivotally connected to said baskets whereby they may be raised or lowered upon the removal of said clamp ring.

5. A filter comprising an upright body, a cap secured over said body, said body containing an annular chamber extending into said cap, a controllable inlet to said chamber, a series of annular communicating chambers below said inlet chambers, said second named chamber progressively decreasing in diameter, baskets disposed in each of said series of chambers, a clamp ring removably engaged in the upper chamber adapted to maintain said basket in position, a sedimentation chamber in the lower portion of said body, said sedimentation chamber having an inclined bottom, and controllable outlets from said chamber, said outlets leading from the upper and lower portions of said chamber respectively.

6. A filter comprising an upright body having a plurality of decreasing annular chambers axially arranged and in communication, the marginal edges of the chambers forming a succession of steps, open meshed baskets suited to said chambers, annular outward flanges on each basket, said flanges being supported on the steps, impervious rings over said flanges, and an externally threaded clamp ring adapted to clamp said rings and flanges preventing the passage of liquid exteriorly of the baskets.

In testimony whereof I have signed my name to this specification.

ANGELO M. CAPRO.